Jan. 9, 1968 TOMIO HIROSAWA 3,362,288

SLIDE FEED OPERATING DEVICE IN OPTICAL PROJECTORS

Filed Sept. 6, 1966

Tomio Hirosawa,
INVENTOR.

BY Wenderoth, Lind
and Ponack,
Attorneys

United States Patent Office 3,362,288
Patented Jan. 9, 1968

3,362,288
SLIDE FEED OPERATING DEVICE IN
OPTICAL PROJECTORS
Tomio Hirosawa, Tokyo-to, Japan, assignor to Cabin
Kogyo Kabushiki Kaisha, Tokyo-to, Japan
Filed Sept. 6, 1966, Ser. No. 577,475
Claims priority, application Japan, Sept. 9, 1965,
40/74,050
2 Claims. (Cl. 88—28)

This invention relates to optical image projectors and more particularly to so-called slide projectors. More specifically, the invention concerns a new and improved slide feed operating device in an optical image projector, which device has good performance and other highly desirable features.

In a slide projector, in general, the operation of feeding image-bearing transparencies (hereinafter referred to as "slides") successively into the image projecting light path is required. According to common practice, this operation is accomplished by cauing a magazine containing a large number of slides in parallel disposition at equal space intervals to operate cooperatively with a feed bar mechanism and causing the magazine to shift by one space interval each time the feed bar mechanism undergoes one cyclic, reciprocating action.

Together with improvements in the functioning and performance of projectors of this type, there have recently appeared projectors in which the feed lever mechanism can be remotely controlled. In these projectors known heretofore, in most cases, the driving power from a power source, such as an electric motor, is transmitted to the feed lever mechanism by means of a gear train or a pulley-and-belt tranmission a part of which can be controllably coupled and uncoupled, and, when it is desired to operate the feed bar, the power transmitting means is coupled by the operation of an actuating means such as a mechanical actuator or an electromagnetic plunger mechanism. In known device of this type, however, the coupling and uncoupling speeds are slow, and, moreover, the operation lacks smoothness, whereby operational failures frequently occur.

It is an object of the present invention to provide a slide feed operating device having high response speed in coupling and uncoupling action and, moreover, a smooth coupling action.

Another object of the invention is to provide a slide feed operating device of high reliability and high durability.

A further object of the invention is to provide a slide feed operating device of relatively simple construction which requires relatively small installation space.

According to the present invention, briefly stated, there is provided, in an optical image projector of the character referred to above, a slide feed operating device comprising, in combination, a first gear coupled to the feed bar mechanism, an electromagnet fixed integrally and coaxially to the first gear or to one mechanical element of a gear train including a gear always in mesh with the first gear, a rotary element including a magnetic member confronting magnetic poles of the electromagnet and spaced slightly apart therefrom in inoperative state, the rotary element being supported coaxially with and rotatably independently of the first gear, either of the rotary element and the first gear being capable of undergoing axial movement relative to the other, a power source to drive the rotary element, and a controllable device to energize the electromagnet thereby to cause the magnetic member to be attracted and secured to the poles confronted thereby and thereby to effect coupling between the rotary element and the first gear.

The nature, principle, and details of the invention will be more clearly apparent from the following detailed description with respect to a preferred embodiment of the invention, when read in conjunction with the accompanying drawings, in which like parts are designated by like reference numerals and characters.

Figure 1:
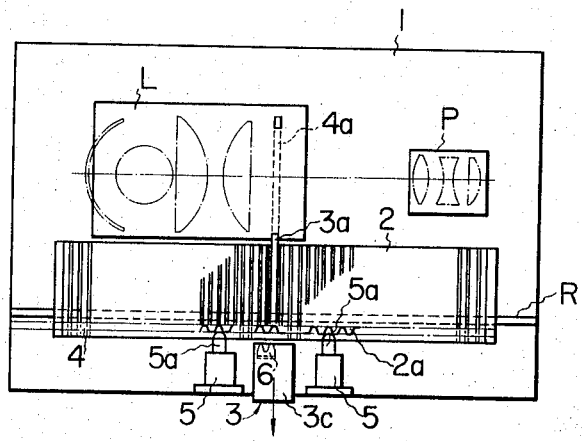
FIG. 1 is a plan view showing the general composition and arrangement of essential parts of a projector in which a device embodying the invention is installed.
Figure 2:
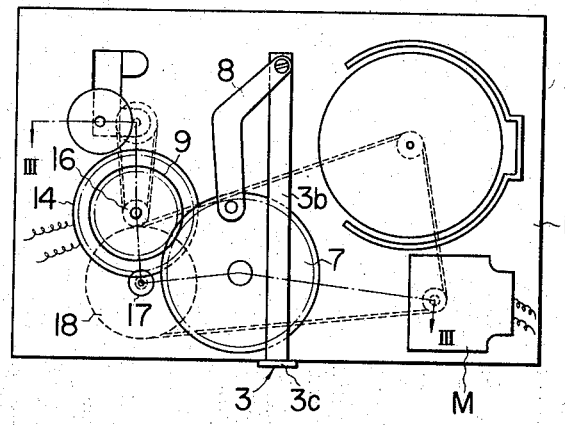
FIG. 2 is a reverse-side plan view showing the essential composition and arrangement of the device according to the invention in the projector shown in FIG. 1.
Figure 3:
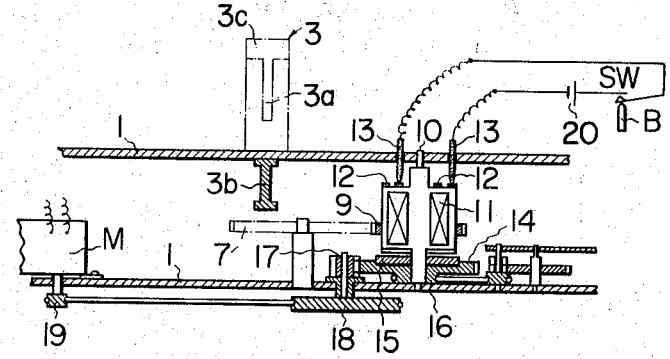
FIG. 3 is a sectional view taken along the bent line III—III in FIG. 2 in the general direction of the arrows shown.

Referring to the drawings, the projector shown therein has a main frame 1 on which there are mounted a light source L, a projection lens system P, and a magazine guide rail R for guiding a magazine 2 of known type which is provided with a rack 2a along one longitudinal side thereof. The magazine 2 is adapted to hold a row of slides 4 in parallel disposition at regular space intervals and to shift intermittently along the rail R, thereby placing each slide 4 in turn in the feeding position for feeding thereof into and extraction from the light path between the light source L and the lens system P.

Each slide 4 in the feeding position is thus fed and extracted by a member 3a mounted on a support arm 3c, which is secured to a sliding member 3b slidably supported within the frame 1. The member 3a, arm 3c and sliding member 3b constitute a slide feed bar 3 which is movable in a direction perpendicular to the optical axis of the projection beam.

Two positioning devices 5, which are fixed to the frame 1 at spaced apart positions on both sides of the slide feeding position, are provided with respective plungers 5a which are urged outwardly by the forces of respective springs (not shown) to engage with recesses between adjacent teeth of the aforementioned rack 2a in order to elastically press the magazine 2 in a constant direction and control accurately the distance of intermittent travel of the magazine 2.

A rack feed pawl 6, which is disposed in the proximity of the rack 2a, is adapted to operate cooperatively with the feed bar 3 through a suitable mechanism (not shown) to cause the magazine 2 to shift through a distance equal to one space interval between adjacent slides when the feed bar 3 is drawn fully outward from its position indicated in FIG. 1 in order to return a slide 4a which has been projected and viewed to its proper original place in the magazine 2.

The other end, that is, the end opposite the end of the support arm 3c, of the feed bar 3 is linked by a pin-jointed connecting link 8 to a gear 7 rotatably supported by the frame 1. The gear 7 is meshed with a gear 9 integrally secured to an electromagnet 11 which is fixed to a shaft 10. The electromagnet 11 is supplied with electrical power through collector rings 12 fixed to the upper surface thereof in an insulated state. The collector rings 12 are electrically contacted by respective brushes 13.

A gear 14, which is rotatably supported on the shaft 10, fixedly supports a magnetic plate 15 confronting the magnetic poles of the electromagnet 11 at a slight distance therefrom and is integrally secured to a coaxial pulley 16. The gear 14 is meshed with a pinion 17 fixed integrally with a pulley 18 by way of a common shaft which is rotatably supported by the frame 1. The pulley 18 is driven by way of an endless belt by a driving pulley 19 fixed to the shaft of a motor M.

The slide feed operating device of the above described construction and arrangement according to the invention operates in the following manner. When an operating button B is pushed to close a switch SW, voltage is supplied by a power source 20 to energize the electromagnet 11, which thereupon attracts and securely holds the magnetic plate 15. Consequently, the rotation of the gear 14, which is driven by the motor M and is fixed to the magnetic plate 15, is transmitted to the gear 7 by way of the gear 9 fixed to the electromagnet 11 and meshed with the gear 7, whereby the slide feed bar 3 is caused to undergo a reciprocating movement. For good cohesive and positive clutching action between the lower surface of the electromagnet 11 and the upper surface of the magnetic plate 15, it is preferable that these surfaces have a rough finish.

In the actual use of the above described device, the gear 14 is maintained in continuous rotation, and the operator pushes the operating button B as necessary and releases the same when a slide has been exchanged and a new slide has been inserted into the projecting light path.

As described above, the present invention resides essentially in a slide feed operating device in a slide projector, in which device an electromagnetic coupling and uncoupling or clutch mechanism is inserted in a wheel train for transmitting driving power from a power source means to a slide feed bar mechanism, whereby a higher response speed in coupling and uncoupling action and, moreover, a much smoother coupling action are obtainable than in known devices of similar type.

Furthermore, since the gears 9 and 14 are coupled electromagnetically, the device is protected from damage since the coupled surfaces will slip if an abnormal load should be imparted to the feed bar mechanism, whereby the durability of the device for long use is high. A further advantage of the device of the invention is that, since the electromagnetic clutch mechanism requires only a relatively small space in the horizontal direction, the entire projector can be reduced in volumetric size to a greater extent than in the case of projectors provided with known slide feed operating devices.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. An optical image projector including a magazine adapted to contain slides and movably disposed on a projector frame, a light source, a lens system, and a slide feed bar mechanism adapted to undergo reciprocating movement to feed and extract slides in the magazine successively into and out of a specific position in the light path from the light source, and a slide feed operating device comprising, in combination, a gear coupled to the feed bar mechanism, an electromagnet fixed integrally and coaxially to said gear, a rotary element including a magnetic member disposed to confront magnet poles of the electromagnet and spaced slightly apart therefrom in inoperative state, said rotary element being supported coaxially with and rotatably independently of said gear, said rotary element and said gear being capable of undergoing movement relative to each other in the axial direction thereof, a power source to drive the rotary element, and controllable means to energize the electromagnet thereby to cause said magnetic member to be attracted and secured to said poles and thereby to effect coupling between the rotary element and said gear.

2. An optical image projector including a magazine adapted to contain slides and movably disposed on a projector frame, a light source, a lens system, and a slide feed bar mechanism adapted to undergo reciprocating movement to feed and extract slides in the magazine successively into and out of a specific position in the light path from the light source, and a slide feed operating device comprising, in combination, a first gear coupled to the feed bar mechanism, a gear train including a gear always in mesh with the first gear, an electromagnet fixed integrally and coaxially to one mechanical element of the gear train, a rotary element including a magnetic member disposed to confront magnetic poles of the electromagnet and spaced slightly apart therefrom in inoperative state, said rotary element being supported coaxially with and rotatably independently of the first gear, said rotary element and said first gear being capable of undergoing movement relative to each other in the axial direction thereof, a power source to drive the rotary element, and controllable means to energize the electromagnet thereby to cause said magnetic member to be attracted and secured to said poles and thereby to effect coupling between the rotary element and the first gear.

References Cited

UNITED STATES PATENTS 2,938,287   5/1960   Bernabei _____ 40—36

FOREIGN PATENTS 211,069   12/1958   Austria.
916,522   1/1963   Great Britain.

NORTON ANSHER, *Primary Examiner.*

G. M. HOFFMAN, *Assistant Examiner.*